United States Patent
Park et al.

(10) Patent No.: US 11,522,208 B2
(45) Date of Patent: Dec. 6, 2022

(54) MEMBRANE-ELECTRODE ASSEMBLY FOR FUEL CELLS WITH IMPROVED CHEMICAL DURABILITY AND PROTON CONDUCTIVITY AND METHOD OF MANUFACTURING THE SAME

(71) Applicants: HYUNDAI MOTOR COMPANY, Seoul (KR); KIA MOTORS CORPORATION, Seoul (KR); INDUSTRY FOUNDATION OF CHONNAM NATIONAL UNIVERSITY, Gwangju (KR)

(72) Inventors: Inyu Park, Seoul (KR); Bo Ki Hong, Seoul (KR); Jae Woon Hong, Gurye-eup (KR); Aniket Kumar, Gwangju (KR); Sun Ju Song, Gwangju (KR)

(73) Assignees: HYUNDAI MOTOR COMPANY, Seoul (KR); KIA MOTORS CORPORATION, Seoul (KR); INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 132 days.

(21) Appl. No.: 16/998,638

(22) Filed: Aug. 20, 2020

(65) Prior Publication Data

US 2021/0135267 A1    May 6, 2021

(30) Foreign Application Priority Data

Oct. 31, 2019  (KR) .................. 10-2019-0137463

(51) Int. Cl.
| | |
|---|---|
| H01M 8/1213 | (2016.01) |
| H01M 8/1039 | (2016.01) |
| H01M 8/1069 | (2016.01) |
| H01M 8/10 | (2016.01) |

(52) U.S. Cl.
CPC ....... *H01M 8/1213* (2013.01); *H01M 8/1039* (2013.01); *H01M 8/1069* (2013.01); *H01M 2008/1095* (2013.01)

(58) Field of Classification Search
None
See application file for complete search history.

(56) References Cited

FOREIGN PATENT DOCUMENTS

CN    107623137 A  *  1/2018

OTHER PUBLICATIONS

Trogadas, P., et al., "Degradation Mitigation in Polymer Electrolyte Membranes Using Cerium Oxide as a Regenerative Free-Radical Scavenger," Electrochemical and Solid-State Letters, vol. 11, pp. B113-B116, 2008. (Year: 2008).*

(Continued)

*Primary Examiner* — Daniel S Gatewood
(74) *Attorney, Agent, or Firm* — McDonnell Boehnen Hulbert & Berghoff LLP (57) ABSTRACT

The present disclosure relates to a membrane-electrode assembly for fuel cells and a method of manufacturing the same, and more particularly to a membrane-electrode assembly to which an electrolyte membrane including a cerium oxide and phosphoric acid functionalized graphene oxide is applied, whereby chemical durability and proton conductivity of the membrane-electrode assembly are improved.

5 Claims, 8 Drawing Sheets

(56) References Cited

OTHER PUBLICATIONS

Curtin, Dennis E., et al., "Advanced materials for improved PEMFC performance and life," Journal of Power Sources, vol. 131, pp. 41-48, 2004.
Young, A.P., et al., "Ionomer Degradation in Polymer Electrolyte Membrane Fuel Cells," Journal of The Electrochemical Society, vol. 157, pp. B425-B436, 2010.
Trogadas, P., et al., "Degradation Mitigation in Polymer Electrolyte Membranes Using Cerium Oxide as a Regenerative Free-Radical Scavenger," Electrochemical and Solid-State Letters, vol. 11, pp. B113-B116, 2008.
Uegaki, Ryoma, et al., "Radical-induced degradation mechanism of perfluorinated polymer electrolyte membrane," Journal of Power Sources, vol. 196, pp. 9856-9861, 2011.
Zhao, D., et al., "Cesium substituted 12-tungstophosphoric ($Cs_xH_{3-x}PW_{12}O_{40}$) loaded on ceria-degradation mitigation in polymer electrolyte membranes," Journal of Power Sources, vol. 190, pp. 301-306, 2009.

\* cited by examiner

MEMBRANE-ELECTRODE ASSEMBLY FOR FUEL CELLS WITH IMPROVED CHEMICAL DURABILITY AND PROTON CONDUCTIVITY AND METHOD OF MANUFACTURING THE SAME

CROSS REFERENCE TO RELATED APPLICATIONS

This application claims, under 35 U.S.C. § 119(a), the benefit of priority to Korean Patent Application No. 10-2019-0137463 filed on Oct. 31, 2019, the entire contents of which are incorporated herein by reference.

BACKGROUND

(a) Technical Field

The present disclosure relates to a membrane-electrode assembly for fuel cells and a method of manufacturing the same, and more particularly to a membrane-electrode assembly to which an electrolyte membrane including a cerium oxide and phosphoric acid functionalized graphene oxide is applied, whereby chemical durability and proton conductivity of the membrane-electrode assembly are improved.

(b) Background Art

A polymer electrolyte membrane fuel cell for vehicles, which is an electricity generator that generates electricity through electrochemical reaction between hydrogen and oxygen in air, is well known as an environmentally-friendly next-generation energy source exhibiting high generation efficiency and having no exhaust materials other than water. In addition, the polymer electrolyte membrane fuel cell is generally operated at a temperature of 95° C. and may have high output density. Reaction for generation of electricity in the fuel cell occurs at a membrane-electrode assembly (MEA) including a perfluorinated sulfonic acid (PFSA) ionomer-based electrolyte membrane and an anode/cathode. Hydrogen supplied to the anode, which is an oxidation electrode, of the fuel cell is divided into protons and electrons. The protons move to the cathode, which is a reduction electrode, through the membrane, and the electrons move to the cathode through an external circuit. At the cathode, oxygen molecules, the protons, and the electrons react with each other to generate electricity and heat, and water ($H_2O$) is generated as a reaction byproduct.

In general, hydrogen and oxygen in air, which are reaction gases of the fuel cell, may cross over in the electrolyte membrane, whereby generation of hydrogen peroxide (HOOH) is accelerated. The hydrogen peroxide (HOOH) generates oxygen-containing radicals, such as a hydroxyl radical (.OH) and a hydroperoxyl radical (.OOH). The radicals attack the perfluorinated sulfonic acid electrolyte membrane, whereby chemical degradation of the electrolyte membrane is caused and eventually durability of the fuel cell is reduced (D. E. Curtin et al., J. Power Sources, 131, 41-48 (2004); A. P. Young et al., J. Electrochem. Soc., 157, B425-B436 (2010); P. Trogadas et al., Electrochem. Solid-State Lett., 11, B113-B116 (2008); R. Uegaki et al., J. Power Sources, 196, 9856-9861 (2011); D. Zhao et al., J. Power Sources, 190, 301-306 (2009)).

Conventionally, a method of adding various kinds of antioxidants to the electrolyte membrane was used as technology for mitigating chemical degradation of the electrolyte membrane and the membrane-electrode assembly.

The antioxidants include a primary antioxidant having the function of a radical scavenger and a secondary antioxidant having the function of a hydrogen peroxide decomposer.

A cerium-based antioxidant, such as a cerium oxide or cerium (iii) nitrate hexahydrate, or a terephthalic acid-based antioxidant is used as the primary antioxidant. A manganese-based antioxidant, such as a manganese oxide, is used as the secondary antioxidant.

However, in the case in which the above antioxidant is added in order to mitigate chemical degradation of the electrolyte membrane and the membrane-electrode assembly, proton conductivity of the electrolyte membrane is reduced.

The above information disclosed in this Background section is provided only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art.

It is an object of the present disclosure to provide an electrolyte membrane exhibiting higher chemical durability and proton conductivity than a conventional perfluorinated sulfonic acid ionomer-based electrolyte membrane, such as Nafion, and a membrane-electrode assembly including the same.

The objects of the present disclosure are not limited to those described above. The objects of the present disclosure will be clearly understood from the following description and could be implemented by means defined in the claims and a combination thereof.

In one aspect, the present disclosure provides a membrane-electrode assembly for fuel cells, the membrane-electrode assembly including an electrolyte membrane and a pair of electrodes provided on opposite surfaces of the electrolyte membrane, wherein the electrolyte membrane includes a cerium oxide and phosphoric acid functionalized graphene oxide.

The electrolyte membrane may include a perfluorinated sulfonic acid (PFSA) ionomer.

The cerium oxide and phosphoric acid functionalized graphene oxide may have a structure in which the cerium oxide is distributed on the surface of the graphene oxide and the phosphoric acid is bonded to an oxygen element included in a functional group of the graphene oxide.

The electrolyte membrane may include 0.01 wt % to 20.0 wt % of the functionalized graphene oxide.

The electrolyte membrane may include a porous reinforcement layer impregnated with anion transfer material and the functionalized graphene oxide, and an ion transfer layer provided on at least one surface of the reinforcement layer, the ion transfer layer including an ion transfer material and the functionalized graphene oxide.

The reinforcement layer may include any one selected from the group consisting of polytetrafluoroethylene (PTFE), expanded polytetrafluoroethylene (e-PTFE), polyethylene (PE), polypropylene (PP), a polyphenylene oxide (PPO), polybenzimidazole (PBI), polyimide (PI), polyvinylidene fluoride (PVdF), polyvinyl chloride (PVC), and a combination thereof.

In another aspect, the present disclosure provides a method of manufacturing a membrane-electrode assembly for fuel cells, the method including preparing a cerium oxide and phosphoric acid functionalized graphene oxide, mixing the functionalized graphene oxide with an ion transfer material, manufacturing an electrolyte membrane using the mixture, and forming electrodes on opposite surfaces of the electrolyte membrane.

The preparing a cerium oxide and phosphoric acid functionalized graphene oxide may include (a) functionalizing a graphene oxide with phosphoric acid and (b) functionalizing a graphene oxide with a cerium oxide.

The functionalizing a graphene oxide with phosphoric acid may include mixing a phosphoric acid precursor material and a graphene oxide to manufacture a first mixture, introducing an active additive into the first mixture to manufacture a second mixture, separating the second mixture into a liquid material and a solid material, drying the separated solid material to manufacture solid powder, and washing the solid powder to obtain a phosphoric acid functionalized graphene oxide (PGO).

The functionalizing a graphene oxide with a cerium oxide may include mixing a cerium precursor material and a graphene oxide to manufacture a third mixture, and reacting the third mixture to obtain a cerium oxide functionalized graphene oxide.

The phosphoric acid precursor material may include triethylphosphite($P(OEt)_3$).

The first mixture may be manufactured by mixing 100 parts by weight of the phosphoric acid precursor material and 0.1 to 2.0 parts by weight of the graphene oxide with each other.

The active additive may include lithium bromide (LiBr).

0.1 to 5.0 parts by weight of the active additive may be introduced based on 100 parts by weight of the phosphoric acid precursor material.

The cerium precursor material may include cerium nitrate hexahydrate ($Ce(NO_3)_3 \cdot 6H_2O$).

The third mixture may be manufactured by mixing 100 parts by weight of the graphene oxide and 1.0 part by weight to 20.0 parts by weight of the cerium precursor material with each other.

The manufacturing an electrolyte membrane may include coating the mixture on a substrate.

The manufacturing an electrolyte membrane may include impregnating a porous reinforcement layer with the mixture, and coating the mixture on at least one surface of the reinforcement layer.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

The objects described above, and other objects, features and advantages will be clearly understood from the following preferred embodiments with reference to the attached drawings. However, the present disclosure is not limited to the embodiments and will be embodied in different forms. The embodiments are suggested only to offer thorough and complete understanding of the disclosed contents and sufficiently inform those skilled in the art of the technical concept of the present disclosure.

Like reference numbers refer to like elements throughout the description of the figures. In the drawings, the sizes of structures are exaggerated for clarity. It will be understood that, although the terms "first", "second", etc. may be used herein to describe various elements, corresponding elements should not be understood to be limited by these terms, which are used only to distinguish one element from another. For example, within the scope defined by the present disclosure, a first element may be referred to as a second element and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all numbers, figures and/or expressions. In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

Figure 1:
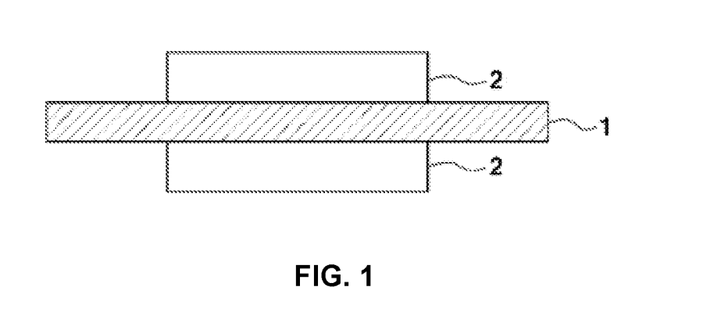
FIG. 1 is a cross-sectional view schematically showing a membrane-electrode assembly according to the present disclosure.

FIG. 1 is a cross-sectional view schematically showing a membrane-electrode assembly according to the present disclosure. Referring to this figure, the membrane-electrode assembly includes an electrolyte membrane 1 and a pair of electrodes 2 provided on opposite surfaces of the electrolyte membrane 1. Here, "a pair of electrodes" means an anode and a cathode, which are located opposite each other based on the electrolyte membrane.

Figure 2:
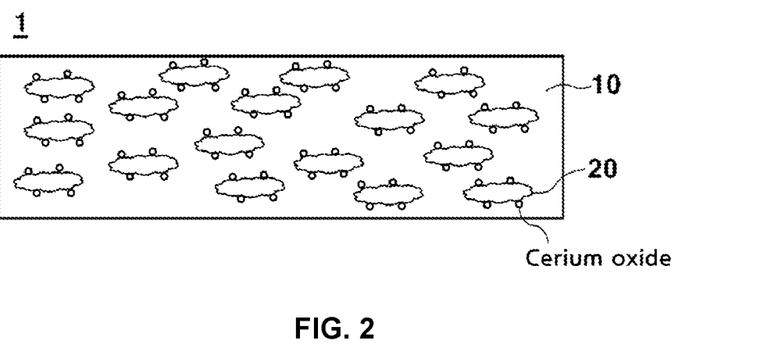
FIG. 2 is a cross-sectional view showing an electrolyte membrane according to an embodiment of the present disclosure.

FIG. 2 is a cross-sectional view showing an electrolyte membrane 1 according to an embodiment of the present disclosure. Referring to this figure, the electrolyte membrane 1 includes an ion transfer material 10 and a cerium oxide and phosphoric acid functionalized graphene oxide (hereinafter referred to as a "functionalized graphene oxide") 20.

The ion transfer material 10 may include any material capable of transferring protons. For example, the ion transfer material 10 may include a perfluorinated sulfonic acid (PFSA) ionomer.

The functionalized graphene oxide 20 is dispersed in the ion transfer material 10. As a result, water uptake rate of the electrolyte membrane 1 is increased, and proton conductivity and chemical durability of the electrolyte membrane 1 are improved.

In general, graphene, which is a material in which carbon is bonded in a two-dimensional honeycomb structure, has the basic form of a carbon-carbon bonded material, whereas the graphene oxide has a form in which a functional group, such as a carboxyl group, a hydroxyl group, or an epoxy group, is bonded to the graphene.

In this specification, "functionalized" means that the cerium oxide and/or the phosphoric acid is related to the graphene oxide, the meaning of which will be more clearly grasped from the following description.

The cerium oxide functionalized graphene oxide may be the graphene oxide having the cerium oxide distributed on the surface thereof. Specifically, a precursor of the cerium oxide may approach the surface of the graphene oxide, and may be grown as the cerium oxide. The cerium oxide may be attached to the surface of the graphene oxide, may be bonded to a carbon element of the graphene oxide, or may be bonded to a functional group of the graphene oxide.

The cerium oxide has the function of a radical scavenger. In the case in which the cerium oxide functionalized graphene oxide is applied to the electrolyte membrane 1, it is possible to greatly improve chemical durability of the electrolyte membrane 1.

Figure 3:
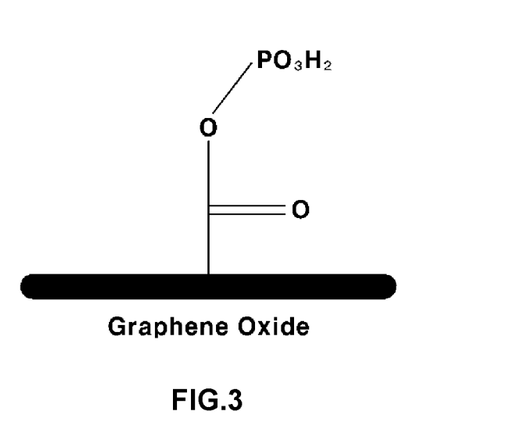
FIG. 3 is a view schematically showing a phosphoric acid functionalized graphene oxide.

The phosphoric acid functionalized graphene oxide may have a structure in which the phosphoric acid is bonded to an oxygen element included in a functional group of the graphene oxide. FIG. 3 is a view schematically showing the phosphoric acid functionalized graphene oxide. Here, a carboxyl group is expressed as the functional group. However, the present disclosure is not limited thereto.

Referring to this figure, the graphene oxide includes an oxygen-containing functional group selected from the group consisting of a carboxyl group, a hydroxyl group, or an epoxy group, and a combination thereof. The phosphoric acid functionalized graphene oxide is formed as the result of covalent bonding between the phosphoric acid and oxygen of the oxygen-containing functional group.

Since the phosphoric acid is directly covalently bonded to the oxygen-containing functional group of the graphene oxide, the number of acid phosphate groups per unit domain of the graphene oxide is remarkably increased. As a result, the hydrophilic domain of the graphene oxide is expanded, whereby proton conductivity of the electrolyte membrane 1 is greatly improved.

In addition, since phosphoric acid is a very strong acid, corrosiveness of the phosphoric acid is high. Consequently, in the case in which the phosphoric acid is directly mixed with the perfluorinated sulfonic acid ionomer 10, which is the ion transfer material, the phosphoric acid may leach out during operation of a fuel cell. In the present disclosure, however, the phosphoric acid is covalently bonded to the graphene oxide, and then the same is mixed with the ion transfer material 10, whereby the leaching-out phenomenon does not occur.

The electrolyte membrane 1 may include 0.01 wt % to 20.0 wt %, preferably 0.1 wt % to 5.0 wt %, and more preferably 0.5 wt % to 2.0 wt % of the functionalized graphene oxide 20. If the content of the functionalized graphene oxide 20 is too small, it is not possible to obtain the effect in which the functionalized graphene oxide 20 is applied. If the content of the functionalized graphene oxide 20 is too large, which means that the content of the functionalized graphene oxide 20 is excessive, brittleness of the electrolyte membrane 1 may be increased, and mechanical strength of the electrolyte membrane 1 may be decreased.

Figure 4:
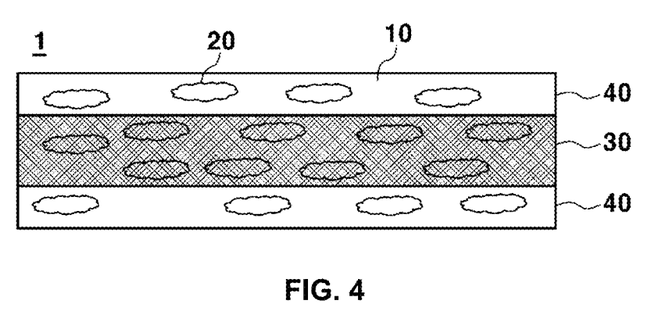
FIG. 4 is a sectional view showing an electrolyte membrane according to another embodiment of the present disclosure.

FIG. 4 is a cross-sectional view showing an electrolyte membrane 1 according to another embodiment of the present disclosure. Referring to this figure, the electrolyte membrane 1 may include a porous reinforcement layer 30 and an ion transfer layer 40 provided on at least one surface of the reinforcement layer 30.

The reinforcement layer 30 increases mechanical rigidity of the electrolyte membrane 1. The reinforcement layer 30 may be selected from the group consisting of polytetrafluoroethylene (PTFE), expanded polytetrafluoroethylene (e-PTFE), polyethylene (PE), polypropylene (PP), polyphenylene oxide (PPO), polybenzimidazole (PBI), polyimide (PI), polyvinylidene fluoride (PVdF), polyvinyl chloride (PVC), and a combination thereof. The reinforcement layer 30 may be a porous membrane having a plurality of pores.

The reinforcement layer 30 may be impregnated with the ion transfer material 10 and the functionalized graphene oxide 20.

In addition, the ion transfer layer 40 may include an ion transfer material 10 and a functionalized graphene oxide 20 dispersed in the ion transfer material 10.

The ion transfer material 10 and the functionalized graphene oxide 20 have been described previously, and therefore a detailed description thereof will be omitted.

Figure 5:
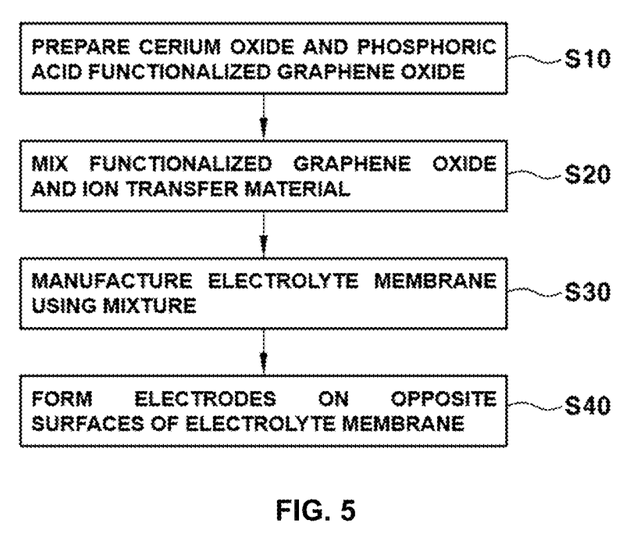
FIG. 5 is a flowchart schematically showing a method of manufacturing a membrane-electrode assembly for fuel cells according to the present disclosure.
Figure 6A:
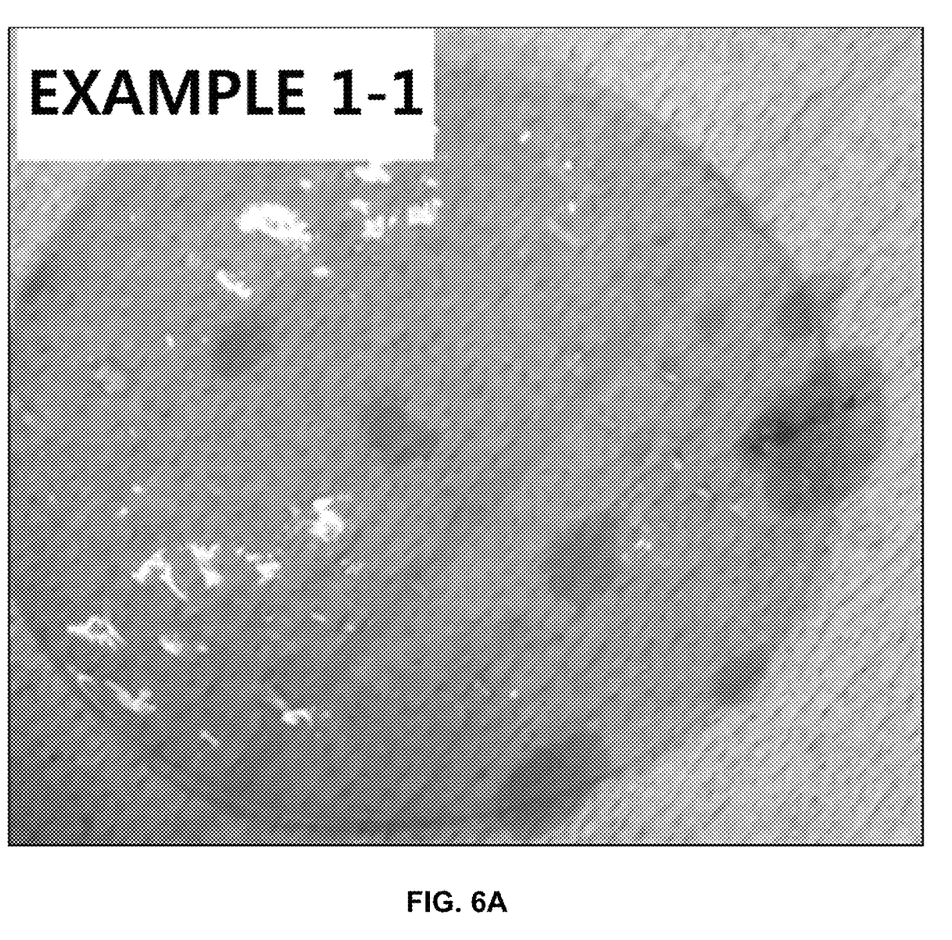
FIGS. 6A, 6B, 6C, and 6D are photographs showing electrolyte membranes manufactured according to Examples 1-1, 1-2, 1-3, and 1-4, respectively.
Figure 6B:
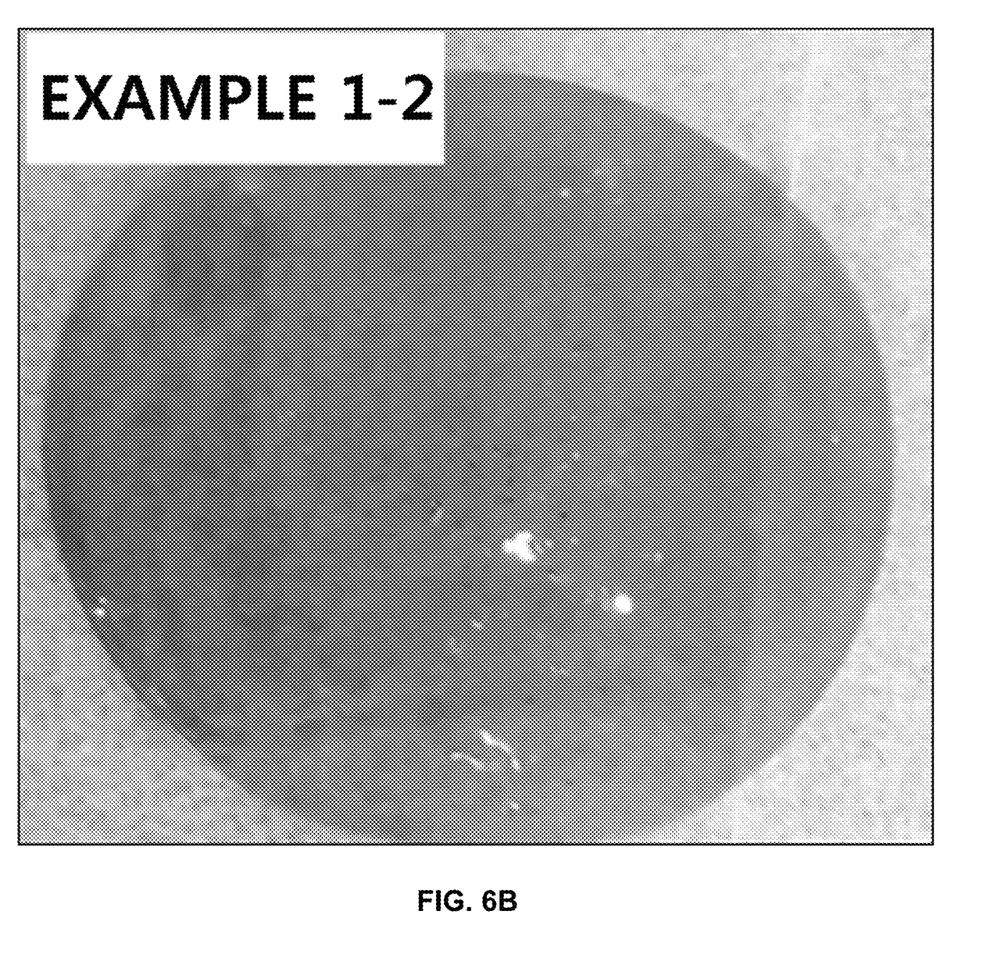
Figure 6C:
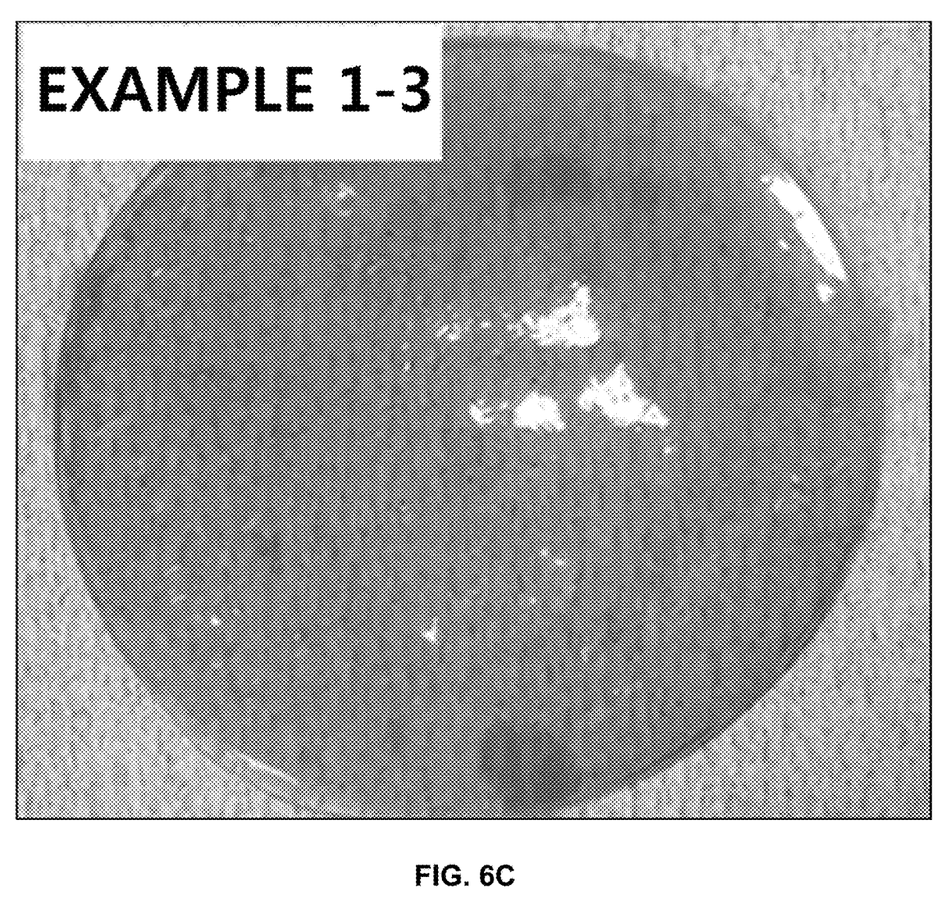
Figure 6D:
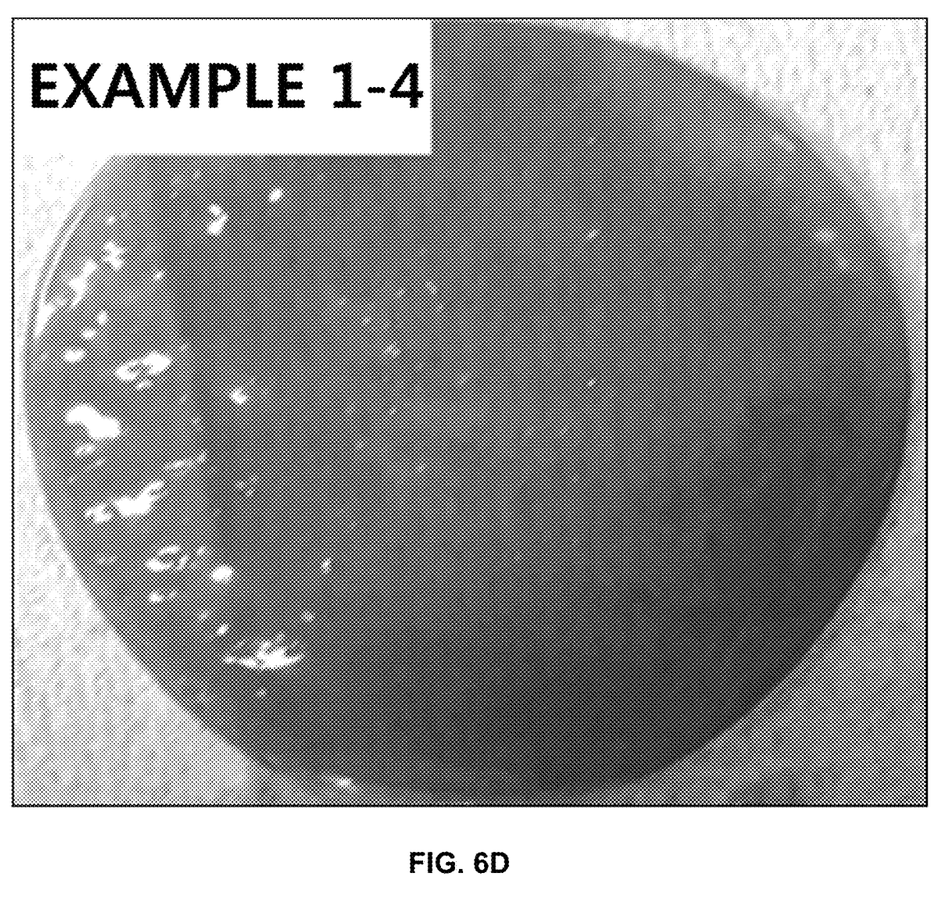

FIG. 5 is a flowchart schematically showing a method of manufacturing a membrane-electrode assembly for fuel cells according to the present disclosure. Referring to this figure, the method may include a step of preparing a cerium oxide and phosphoric acid functionalized graphene oxide (hereinafter referred to as a "functionalized graphene oxide") (S10), a step of mixing the functionalized graphene oxide with an ion transfer material (S20), a step of manufacturing an electrolyte membrane using the mixture (S30), and a step of forming electrodes on opposite surfaces of the electrolyte membrane (S40).

The step of preparing a functionalized graphene oxide (S10) may include (a) a step of functionalizing a graphene oxide with phosphoric acid and (b) a step of functionalizing a graphene oxide with a cerium oxide.

In the case in which phosphoric acid and a cerium oxide are functionalized to the graphene oxide, the sequence is not particularly restricted. In the case in which starting materials that are used at respective steps, a description of which will follow, are appropriately adjusted, it is possible to obtain substantially the same result irrespective of the sequence. In this specification, phosphoric acid is functionalized to the graphene oxide and then cerium oxide is functionalized to the graphene oxide for convenience of description.

The step (a) of functionalizing a graphene oxide with phosphoric acid may include (a-1) a step of mixing a phosphoric acid precursor material and a graphene oxide to manufacture a first mixture, (a-2) a step of introducing an active additive into the first mixture to manufacture a second mixture, (a-3) a step of separating the second mixture into a liquid material and a solid material, (a-4) a step of drying the separated solid material to manufacture solid powder, (a-5) a step of washing the solid powder to obtain a phosphoric acid functionalized graphene oxide, each of which will be described in detail.

(a-1) Step of Manufacturing First Mixture

This step is a step of mixing a phosphoric acid precursor material and a graphene oxide to manufacture a first mixture. The phosphoric acid precursor material is a material for providing phosphoric acid that is functionalized to the graphene oxide, and preferably includes triethylphosphite(P(OEt)$_3$).

The first mixture may be manufactured by mixing 0.1 to 2.0 parts by weight of the graphene oxide with 100 parts by weight of the phosphoric acid precursor material. If the content of the graphene oxide is too small, the percentage of the phosphoric acid functionalized to the graphene oxide is reduced, whereby it is difficult to obtain the substantial phosphoric acid functionalization effect. If the content of the graphene oxide is too large, reaction efficiency is reduced.

Since triethylphosphite forms a hydrocarbon chain having a small volume, triethylphosphite may be functionalized to a domain of the graphene oxide at high density.

(a-2) Step of Manufacturing Second Mixture

This step is a step of introducing and dispersing an active additive into the first mixture to manufacture a second mixture. The active additive is added in order to activate an oxygen-containing functional group present on the surface of the graphene oxide. After activation is completed, the oxygen-containing functional group may be easily bonded to the phosphoric acid precursor material.

Preferably, the active additive includes lithium bromide (LiBr).

Next, 0.1 to 5.0 parts by weight of the active additive is introduced based on 100 parts by weight of the phosphoric acid precursor material. If the content of the active additive is too small, it may be difficult to perfectly activate the oxygen-containing functional group of the graphene oxide. If the content of the active additive is too large, activation efficiency is reduced. Separate dispersion may be performed in order to uniformly mix the active additive with the first mixture. The dispersion may be ultrasonic dispersion (sonication), and may be performed for 10 to 120 minutes.

After the active additive is dispersed, the second mixture is preferably stirred in a nitrogen (N$_2$) atmosphere at 80 to 120° C. for 10 to 50 hours in order to sufficiently activate the oxygen-containing functional group of the graphene oxide.

(a-3) Step of Separating Second Mixture into Liquid Material and Solid Material

After the second mixture is stirred, the second mixture may be separated into a liquid material and a solid material through centrifugal separation and filtering. The centrifugal separation may be performed at 3,000 to 5,000 rpm.

(a-4) Step of Manufacturing Solid Powder

This step is a step of drying the solid material separated at the previous step to manufacture solid powder. Drying may be performed at 60 to 90° C. for 1 to 24 hours.

(a-5) Step of Obtaining Phosphoric Acid Functionalized Graphene Oxide

This step is a step of washing the dried solid powder to obtain a phosphoric acid functionalized graphene oxide. Specifically, the solid powder may be washed using any one selected from the group consisting of tetrahydrofuran (THF), dimethylformamide (DMF), water, and a combination thereof. Washing may be performed several times. However, the final washing is performed using water. An ethoxyl group of triethylphosphite may be changed into a hydroxyl group due to the water, whereby a phosphoric acid functionalized graphene oxide may be obtained.

The step (b) of functionalizing a graphene oxide with a cerium oxide may include (b-1) a step of mixing a cerium precursor material and a graphene oxide to manufacture a third mixture and (b-2) a step of reacting the third mixture to obtain a cerium oxide functionalized graphene oxide. Here, in the case in which the phosphoric acid functionalized graphene oxide is used as the graphene oxide, it is possible to finally obtain a cerium oxide and phosphoric acid functionalized graphene oxide. The steps will be described in detail.

(b-1) Step of Manufacturing Third Mixture

This step is a step of mixing a cerium precursor material and a phosphoric acid functionalized graphene oxide to manufacture a third mixture. The cerium precursor material may include cerium nitrate hexahydrate (Ce(NO$_3$)$_3$.6H$_2$O).

The third mixture may be manufactured by mixing 1.0 part by weight to 20.0 parts by weight, preferably 2.0 parts by weight to 10.0 parts by weight, of the cerium precursor material with 100 parts by weight of the phosphoric acid functionalized graphene oxide. If the content of the cerium precursor material is too small, the percentage of a cerium oxide that is functionalized is reduced, whereby it is difficult to obtain the substantial cerium oxide functionalization effect. If the content of the cerium precursor material is too large, reaction efficiency is reduced.

The cerium precursor material, the phosphoric acid functionalized graphene oxide, and deionized water are uniformly mixed with each other, and then aqueous ammonia may be added to the mixture, in order to control pH of the third mixture so as to be 9 or more.

(b-2) Step of Obtaining Cerium Oxide Functionalized Graphene Oxide

This step is a step of reacting the third mixture to obtain a cerium oxide and phosphoric acid functionalized graphene oxide (or a cerium oxide functionalized graphene oxide). The reaction may be performed at high temperature, and may be performed, for example, at 100° C. to 300° C. for 12 to 48 hours.

Subsequently, the resultant may be washed and centrifuged to separate a solid material therefrom. Washing may be performed using deionized water and/or ethanol.

The solid material may be dried at 50° C. to 200° C. for 12 to 48 hours in order to finally obtain a cerium oxide and phosphoric acid functionalized graphene oxide (or a cerium oxide functionalized graphene oxide).

The functionalized graphene oxide may be mixed with an ion transfer material (S20), and an electrolyte membrane may be manufactured using the mixture (S30).

The electrolyte membrane according to the embodiment of the present disclosure shown in FIG. 2 may be manufactured by coating and drying the mixture on a substrate. At this time, the coating and drying method is not particularly restricted. It is sufficient to use a coating and drying method that is generally used in the field of fuel cells.

The electrolyte membrane according to the embodiment of the present disclosure shown in FIG. 4 may be manufactured by performing a step of impregnating a porous reinforcement layer with the mixture and a step of coating the mixture on at least one surface of the reinforcement layer to form an ion transfer layer.

The reinforcement layer and the ion transfer material have been described previously, and therefore a detailed description thereof will be omitted.

A pair of electrodes may be formed on opposite surfaces of the electrolyte membrane obtained as described above in order to obtain a membrane-electrode assembly. The method of forming the electrodes is not particularly restricted, as long as the method is generally used in order to manufacture the electrodes in the field of fuel cells.

Hereinafter, the present disclosure will be described in more detail with reference to concrete examples. However, the following examples are merely an illustration to assist in understanding the present disclosure, and the present disclosure is not limited by the following examples.

Manufacturing Example

First, 300 ml of triethylphosphite (25° C., 0.969 g/ml) was introduced into a round flask, 300 mg of a graphene oxide was added, and stirring was performed for about 2 hours.

Subsequently, 800 mg of lithium bromide (LiBr) was added to the graphene oxide dispersed solution, and ultrasonic dispersion was further performed for about 60 minutes.

The mixed solution was stirred in a nitrogen atmosphere at 100° C. for 48 hours, and centrifugal separation was performed at 4000 rpm in order to separate the solution into a liquid material and a solid material. Subsequently, the solid powder was dried at 75° C. for about 12 hours.

The dried powder was washed using tetrahydrofuran and dimethylformamide, which were mixed at a ratio of 1:1, and was then washed using deionized water to obtain a phosphoric acid functionalized graphene oxide.

Next, 100 mg of the phosphoric acid functionalized graphene oxide was mixed with 50 mL of deionized water, and ultrasonic dispersion was performed for 4 hours. Cerium nitrate hexahydrate $(Ce(NO_3)_3 \cdot 6H_2O)$ was weighed and added to the dispersed solution such that 5.0 parts by weight of a cerium oxide (Examples 1-1 to 1-4) or 10 parts by weight of a cerium oxide (Example 2) was included based on 100 parts by weight of the phosphoric acid functionalized graphene oxide, and stirring was performed to manufacture a uniformly dispersed solution. Subsequently, 4 mL of aqueous ammonia was added to the dispersed solution such that pH of the dispersed solution was maintained at 9 or more.

While stirring the dispersed solution, high-temperature reaction was performed at 180° C. for about 24 hours. The reacted resultant was washed using deionized water and ethanol, and was separated into a liquid material and a solid material through centrifugal separation. The finally separated solid material was dried at 80° C. for about 24 hours to manufacture a cerium oxide and phosphoric acid functionalized graphene oxide Examples 1-1 to 1-4 and 2

Electrolyte membranes were manufactured using the cerium oxide and phosphoric acid functionalized graphene oxide obtained according to the Manufacturing Example under content conditions shown in Table 1 below.

Specifically, the cerium oxide and phosphoric acid functionalized graphene oxide was mixed with a perfluorinated sulfonic acid ionomer and mixed with dimethylformamide, and the sufficiently mixed solution was coated on a substrate to manufacture an electrolyte membrane.

TABLE 1

| | Content of $CeO_2$ based on weight of PGO[1] | Content of $CeO_2$-PGO included in electrolyte membrane |
|---|---|---|
| Example 1-1 | 5.0 parts by weight | 0.5 wt % |
| Example 1-2 | 5.0 parts by weight | 1.0 wt % |
| Example 1-3 | 5.0 parts by weight | 1.5 wt % |
| Example 1-4 | 5.0 parts by weight | 2.0 wt % |
| Example 2 | 10.0 parts by weight | 2.0 wt % |

[1]Values based on 100 parts by weight of PGO

Comparative Example

An electrolyte membrane was manufactured using the cerium oxide and phosphoric acid functionalized graphene oxide and a perfluorinated sulfonic acid ionomer dispersed solution without addition.

Experimental Example 1—Evaluation with Naked Eye

FIGS. 6A, 6B, 6C, and 6D are photographs showing the electrolyte membranes manufactured according to Examples 1-1, 1-2, 1-3, and 1-4, respectively. Referring to these figures, it can be seen that the larger the content of the cerium oxide and phosphoric acid functionalized graphene oxide, the deeper the color of the electrolyte membrane.

Experimental Example 2—Proton Conductivities Depending on Temperature

Figure 7:
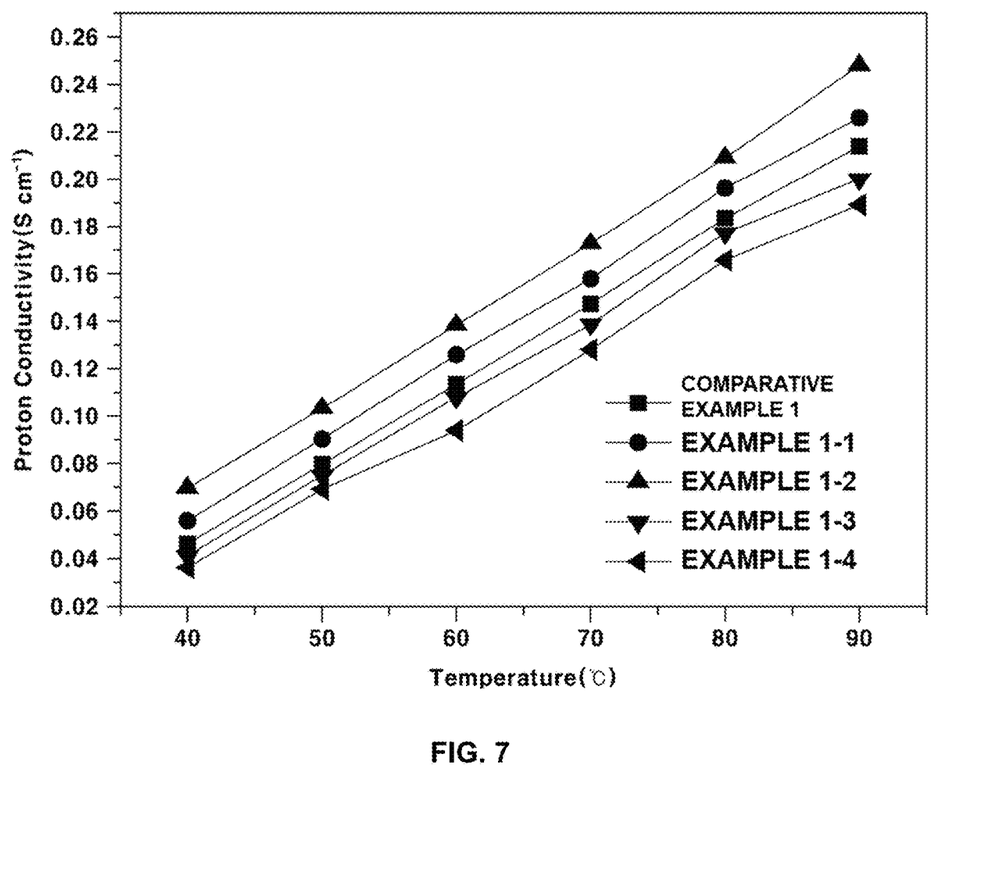
FIG. 7 is a view showing results of measurement of proton conductivities of electrolyte membranes manufactured according to Examples 1-1 to 1-4 and Comparative Example depending on temperature thereof.

Proton conductivities of the electrolyte membranes manufactured according to Examples 1-1 to 1-4 and the Comparative Example depending on temperature thereof were measured. Results are shown in FIG. 7. Proton conductivity tests were performed under conditions of a temperature of 40 to 90° C. and a relative humidity of 100%.

It can be seen that the electrolyte membranes of Examples 1-1 and 1-2 exhibit higher proton conductivities over the entire temperature range than the Comparative Example and that particularly Example 1-2 exhibits the highest conductivity value. In contrast, it can be seen that Examples 1-3 and 1-4, the content of the cerium oxide and phosphoric acid functionalized graphene oxide of which was further increased, exhibit lower proton conductivities than the Comparative Example.

Experimental Example 2—Fluoride Emission Rate Measurement Over Time

Figure 8:
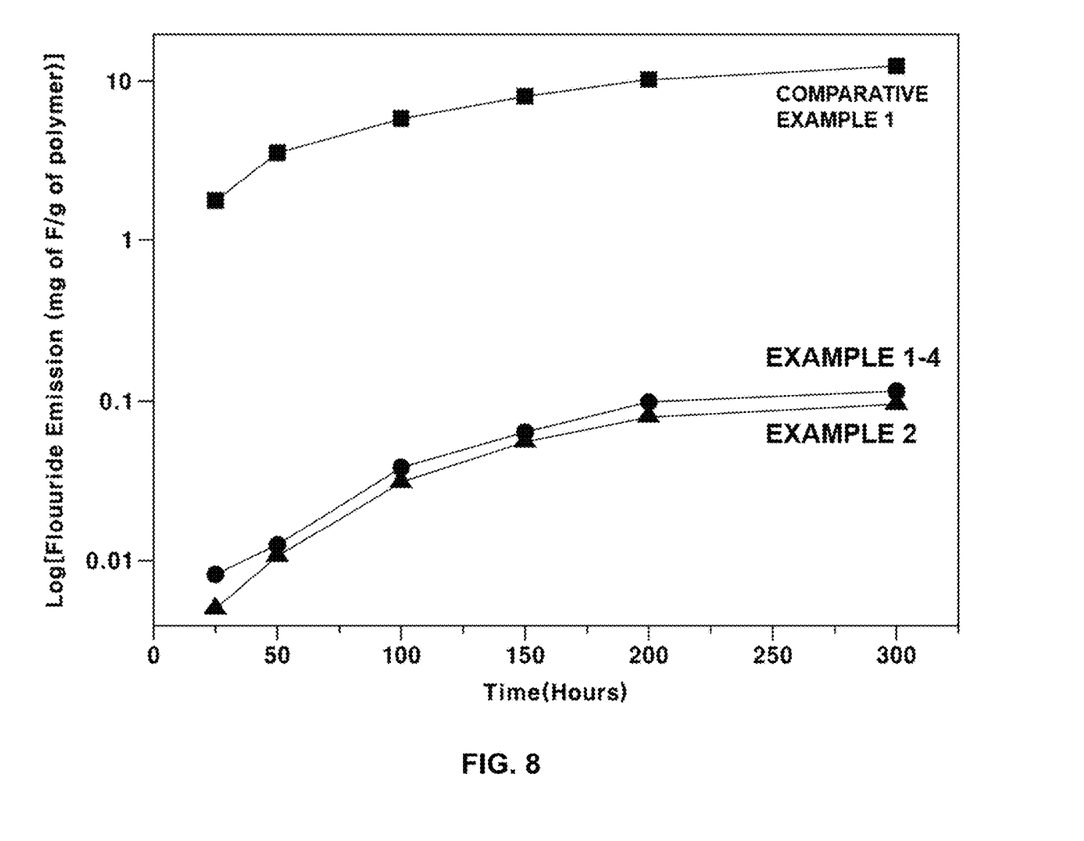
FIG. 8 is a view showing results of measurement of fluoride emission rate of electrolyte membranes manufactured according to Example 1-4, Example 2, and Comparative Example over time.

Fluoride emission rate of the electrolyte membranes manufactured according to Example 1-4, Example 2, and the Comparative Example over time were measured. Results are shown in FIG. 8. Referring to this figure, it can be seen that both Example 1-4 and Example 2 have much smaller amounts of fluoride that is emitted over time than the Comparative Example.

As is apparent from the foregoing, according to the present disclosure, it is possible to obtain an electrolyte membrane having improved chemical durability and proton conductivity and a membrane-electrode assembly including the same.

The effects of the present disclosure are not limited to those mentioned above. It should be understood that the effects of the present disclosure include all effects that can be inferred from the foregoing description of the present disclosure.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. A membrane-electrode assembly for fuel cells, the membrane-electrode assembly comprising:
   an electrolyte membrane; and
   a pair of electrodes provided on opposite surfaces of the electrolyte membrane, wherein the electrolyte membrane comprises a cerium oxide and phosphoric acid functionalized graphene oxide; and
   wherein the cerium oxide and phosphoric acid functionalized graphene oxide has a structure in which the cerium oxide is distributed on a surface of the graphene oxide and the phosphoric acid is bonded to an oxygen element included in a functional group of the graphene oxide; and
   wherein the functional group comprises at least one of a carboxyl group, an epoxy group, or any combination thereof.

2. The membrane-electrode assembly according to claim 1, wherein the electrolyte membrane comprises a perfluorinated sulfonic acid (PFSA) ionomer.

3. The membrane-electrode assembly according to claim 1, wherein the electrolyte membrane comprises 0.01 wt % to 20.0 wt % of the functionalized graphene oxide.

4. The membrane-electrode assembly according to claim 1, wherein the electrolyte membrane comprises:
   a porous reinforcement layer impregnated with anion transfer material and the functionalized graphene oxide; and
   an ion transfer layer provided on at least one surface of the reinforcement layer, the ion transfer layer comprising an ion transfer material and the functionalized graphene oxide; and
   wherein the ion transfer material comprises a perfluorinated sulfonic acid (PFSA) ionomer.

5. The membrane-electrode assembly according to claim 4, wherein the porous reinforcement layer comprises any one selected from a group consisting of polytetrafluoroethylene (PTFE), expanded polytetrafluoroethylene (e-PTFE), polyethylene (PE), polypropylene (PP), a polyphenylene oxide (PPO), polybenzimidazole (PBI), polyimide (PI), polyvinylidene fluoride (PVdF), polyvinyl chloride (PVC), and a combination thereof.

* * * * *